US012277110B2

(12) United States Patent
Frantz et al.

(10) Patent No.: US 12,277,110 B2
(45) Date of Patent: Apr. 15, 2025

(54) PREFETCHING QUERY RESULTS USING EXPANDED QUERIES

(71) Applicant: SIGMA COMPUTING, INC., San Francisco, CA (US)

(72) Inventors: Jason D. Frantz, San Francisco, CA (US); Dmitri Bronnikov, Foster City, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 234 days.

(21) Appl. No.: 17/529,748

(22) Filed: Nov. 18, 2021

(65) Prior Publication Data

US 2023/0153295 A1 May 18, 2023

(51) Int. Cl.
*G06F 16/242* (2019.01)
*G06F 16/25* (2019.01)

(52) U.S. Cl.
CPC ...... *G06F 16/2425* (2019.01); *G06F 16/2423* (2019.01); *G06F 16/256* (2019.01)

(58) Field of Classification Search
CPC ............ G06F 16/283; G06F 16/1824; G06F 16/1865; G06F 16/2433; G06F 16/24568; G06F 16/2455; G06F 16/30; G06F 16/221; G06F 16/2282; G06F 16/254; G06F 16/2456; G06F 16/252; G06F 16/2425; G06F 16/2423
See application file for complete search history.

(56) References Cited

U.S. PATENT DOCUMENTS

| 11,386,158 | B1 | 7/2022 | Bourbie et al. |
| 2014/0280287 | A1* | 9/2014 | Ganti ............... G06F 16/211 707/766 |
| 2020/0151280 | A1 | 5/2020 | Moravec |
| 2020/0334243 | A1 | 10/2020 | Seiden et al. |
| 2020/0349156 | A1* | 11/2020 | Frantz ............ G06F 16/2282 |
| 2022/0067271 | A1 | 3/2022 | Logan et al. |
| 2022/0207096 | A1* | 6/2022 | Salazar ............ G06F 40/30 |
| 2022/0350782 | A1 | 11/2022 | Naganna et al. |
| 2023/0103951 | A1* | 4/2023 | Vezza ............ G06F 16/9574 707/722 |

OTHER PUBLICATIONS

Cunha et al., "Design and Implementation of Queries for Model-Driven Spreadsheets," 18th International Conference on Theory and Applications of Satisfiability Testing (SAT), Sep. 24-27, 2015, pp. 459-478.
International Search Report and Written Opinion, PCT/US2024/014221, May 7, 2024, 12 pages.
(Continued)

*Primary Examiner* — Ajay M Bhatia
*Assistant Examiner* — Berhanu Mitiku

(57) ABSTRACT

Prefetching query results using expanded queries including generating a database query using a state specification of a graphical user interface, wherein the database query is composed to retrieve initial results from a cloud-based data warehouse; determining that the database query is expandable; modifying the database query to retrieve expanded results from the cloud-based data warehouse, wherein the expanded results include the initial results; and fetching, from the cloud-based data warehouse, the expanded results using the modified database query.

20 Claims, 6 Drawing Sheets

(56) References Cited

OTHER PUBLICATIONS

Madaphule et al., "An Application of Databse Query Translation Into Spreadsheets," International Conference on Electrical Electronics, and Optimization Techniques (ICEEOT), 2016.

Ragavan et al., "GridBook: Natural Language Formulas for the Spreadsheet Grid," Proceedings of the 27th ACM Symposium on Virtual Reality Software and Technology, New York, NR, Mar. 22, 2022, pp. 345-368.

Sroka et al., "Translating Relational Queries into Spreadsheets," IEEE Transactions on Knowledge and Data Engineering, vol. 27, No. 8, Aug. 2015.

Terlelcki et al., "On Improving User Response Times in Tableau," 2015 ACM SIGMOD/PODS Conference, Melbourne, Australia, May 31-Jun. 4, 2015.

\* cited by examiner

PREFETCHING QUERY RESULTS USING EXPANDED QUERIES

BACKGROUND

Field of the Invention

The field of the invention is data processing, or, more specifically, methods, apparatus, and products for prefetching query results using expanded queries.

Description Of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for prefetching query results using expanded queries. Prefetching query results using expanded queries includes generating a database query using a state specification of a graphical user interface, wherein the database query is composed to retrieve initial results from a cloud-based data warehouse; determining that the database query is expandable; modifying the database query to retrieve expanded results from the cloud-based data warehouse, wherein the expanded results include the initial results; and fetching, from the cloud-based data warehouse, the expanded results using the modified database query.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
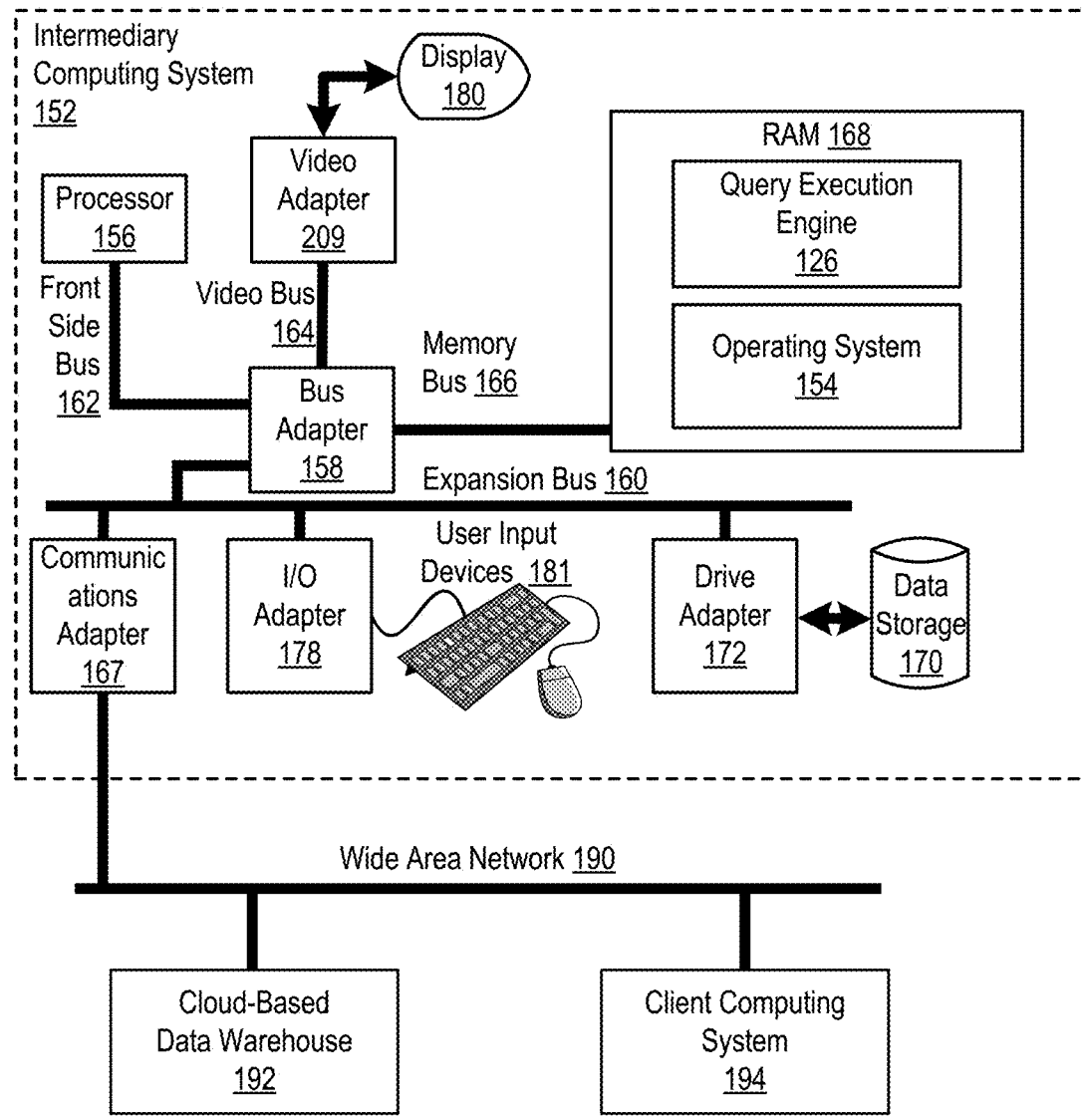
FIG. 1 sets forth a block diagram of an example system configured for prefetching query results using expanded queries according to embodiments of the present invention.

Exemplary methods, apparatus, and products for prefetching query results using expanded queries in accordance with the present invention are described with reference to the accompanying drawings, beginning with FIG. 1. FIG. 1 sets forth a block diagram of automated computing machinery comprising an exemplary intermediary computing system 152 configured for prefetching query results using expanded queries according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for prefetching query results using expanded queries according to embodiments of the present invention include UNIX™, Linux™, Microsoft Window™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the query execution engine 126, a module for prefetching query results using expanded queries according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for prefetching query results using expanded queries according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for prefetching query results using expanded queries according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the query execution engine 126. Although FIG. 1 depicts the query execution engine within the intermediary computing system 152, the query execution engine may alternatively be executed within the client computing system 194.

Figure 2:
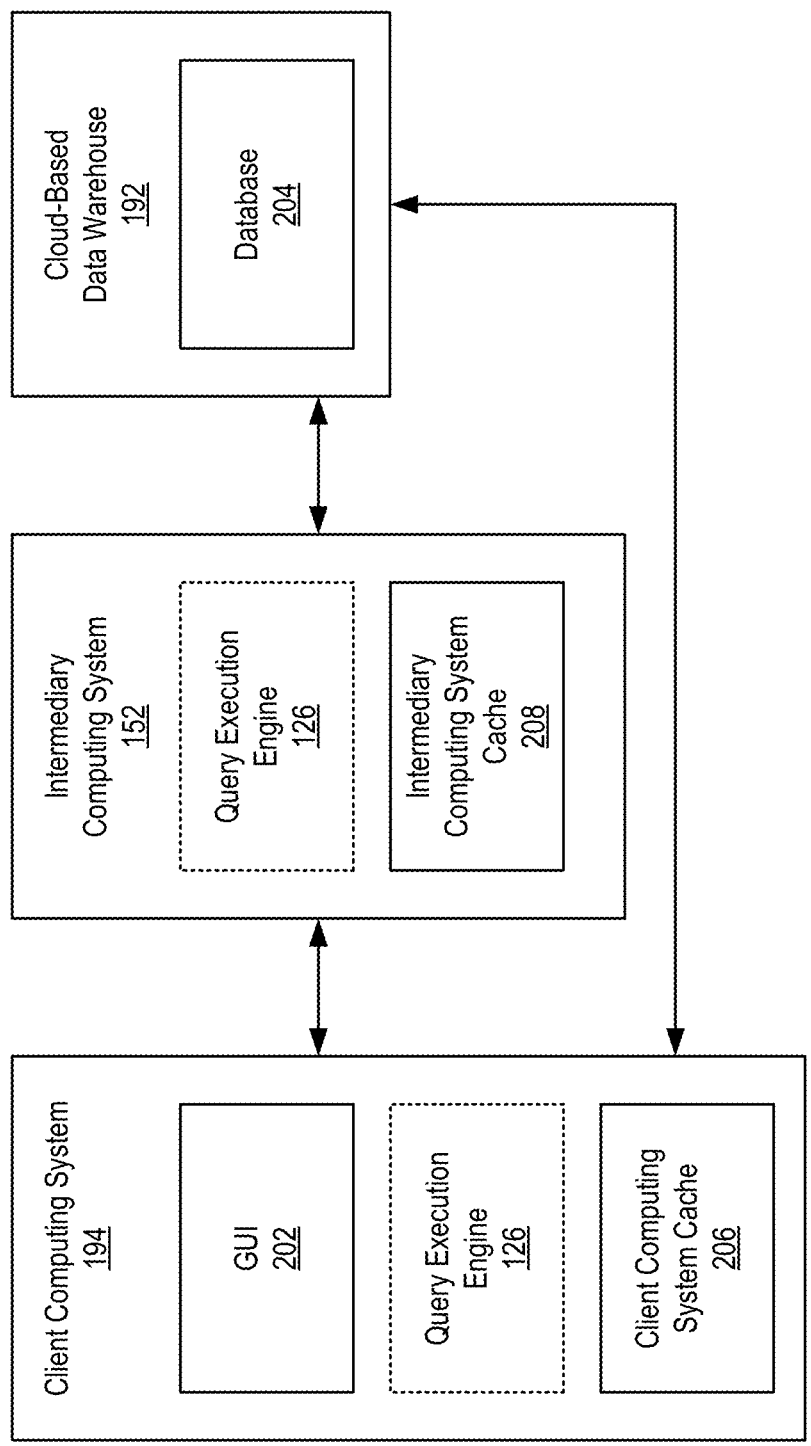
FIG. 2 sets forth a block diagram of an example system configured for prefetching query results using expanded queries according to embodiments of the present invention.

FIG. 2 shows an exemplary system for prefetching query results using expanded queries according to embodiments of the present invention. As shown in FIG. 2, the system includes a client computing system 194, an intermediary computing system 152, and a cloud-based data warehouse 192. The client computing system 194 includes a graphical user interface (GUI) 202 and a client computing system cache 206. The intermediary computing system 152 includes an intermediary computing system cache 208. The cloud-based data warehouse 192 includes a database 204. The query execution engine 126 may reside on either the client computing system 194 and/or the intermediary computing system 152 and utilize the associated computing system cache (client computing system cache 206, intermediary computing system cache 208). The cache may be a browser cache associated with an Internet browser. The client computing system 194 may access the cloud-based data warehouse 192 and database 204 directly or may access the cloud-based data warehouse 192 and database 204 via the intermediary computing system 152.

The GUI 202 is a visual presentation configured to present data sets in the form of worksheets and graphical elements to a user. The GUI 202 also receives requests from a user for data sets from the database 204. The GUI 202 may be presented, in part, by the query execution engine 126 and displayed on a client computing system 194 (e.g., on a system display or mobile touchscreen). The GUI 202 may be part of an Internet application that includes the query execution engine 126 and is hosted on the intermediary computing system 152. Alternatively, the GUI 202 may be part of an Internet application that includes the query execution engine 126 and is hosted on the client computing system 194.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. A data set, as sent from the database to the intermediary computing system 152 and client computing system 194, may be a portion or subset of a source database table on the database. Data sets may be sent from the cloud-based data warehouse 192 in response to a database query. Accordingly, data sets retrieved in response to a database query may be referred to as query results.

The query execution engine 126 is hardware, software, or an aggregation of hardware and software configured to receive a state specification from the client computing system 194, via the GUI 202. The query execution engine 126 is also configured to generate database queries in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The query execution engine 126 uses the state specification as input to generate a database query. This transformation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

The query execution engine 126 may use the database query to fetch query results (i.e. a data set) from the database 204. The query execution engine 126 may then present the query results to a user via the GUI 202. The query execution engine 126 may also store the query results in a cache (client computing system cache 206, intermediary computing system cache 208) for later retrieval if the same or similar query is generated from a state specification. Further, as described below, the query execution engine 126 may expand the generated database queries such that the expanded results stored in the cache may be used to locally service a greater number of database queries without sending additional database queries to the cloud-based data warehouse 192.

Figure 3:
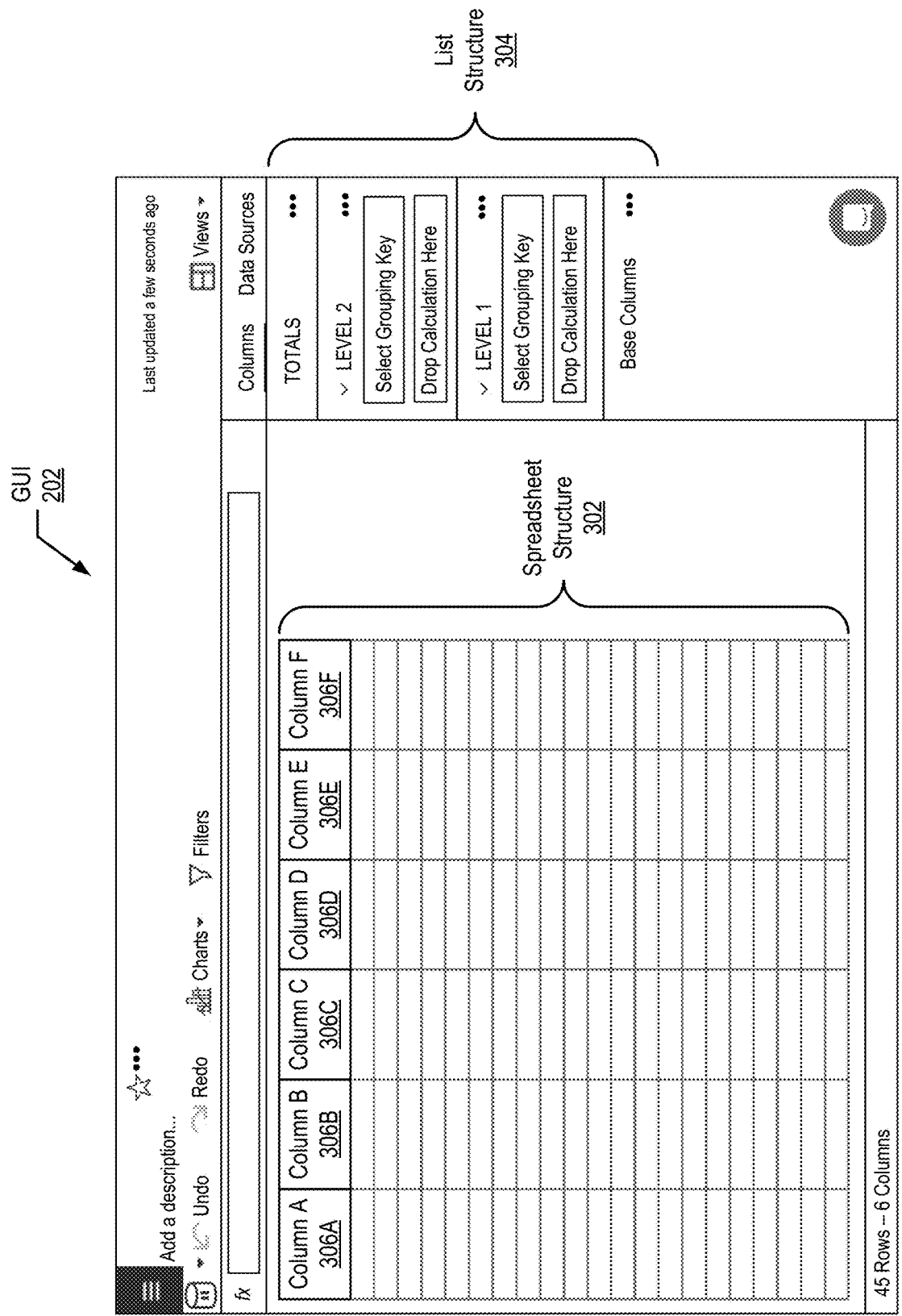
FIG. 3 sets forth a block diagram of an example system configured for prefetching query results using expanded queries according to embodiments of the present invention.

FIG. 3 shows an exemplary system for prefetching query results using expanded queries according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F).

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the query execution engine 126. Such a mechanism may also include a direct identification of the rows and columns of a database table that a user would like to access (e.g., via a selection of the rows and columns in a dialog box).

Figure 4:
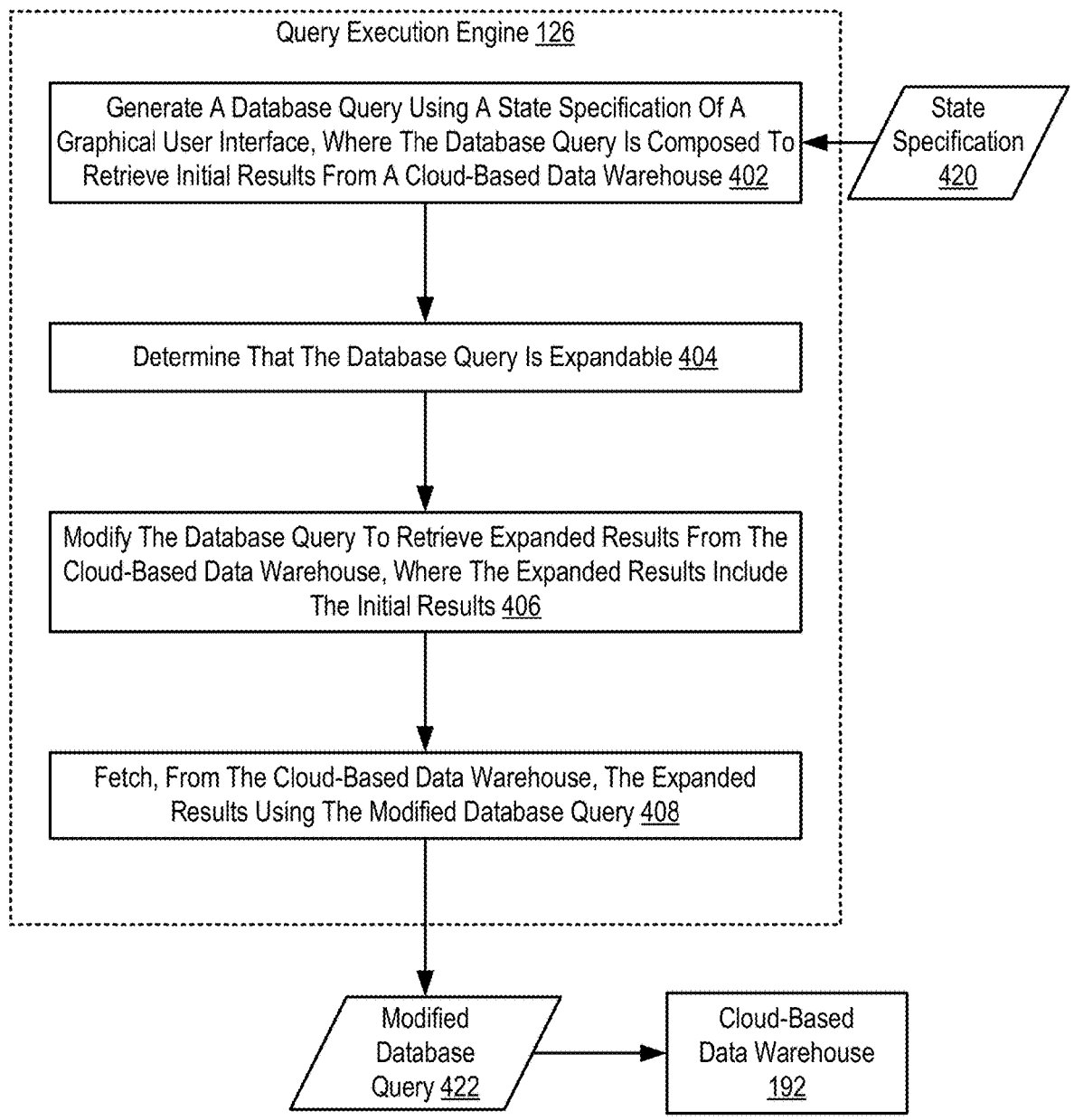
FIG. 4 sets forth a flow chart illustrating an exemplary method for prefetching query results using expanded queries according to embodiments of the present invention.

For further explanation, FIG. 4 sets forth a flow chart illustrating an exemplary method for prefetching query results using expanded queries according to embodiments of the present invention. As discussed above, the query execution engine 126 may reside with the GUI on a client computing system or separate from the GUI on the intermediary computing system between the client computing system and the cloud-based data warehouse 192. Alternatively, portions of the query execution engine 126 may be distributed between the client computing system and the intermediary computing system.

The method of FIG. 4 includes generating 402 a database query using a state specification 420 of a graphical user interface, wherein the database query is composed to retrieve initial results from a cloud-based data warehouse 192. Generating 402 a database query using a state specification 420 may be carried out by detecting that a user has manipulated elements of the GUI and/or submitted data using the GUI such that the generation of a state specification 420 is triggered, and the state specification 420 is sent to the query execution engine 126. For example, a user may select a table from a group of tables presented for display in a worksheet on the GUI. As another example, a user may change the order of columns in the dimensional hierarchy of the GUI. Each change to the GUI may result in a new or updated state specification 420.

The state specification 420 may then be translated into the database query. Specifically, the state specification is converted or lowered into various intermediate forms, including an abstract syntax tree, a canonicalized hierarchy, a worksheet algebra, and a relational algebra. During each of these intermediate forms, the query execution engine 126 may optimize the database query to efficiently retrieve the initial results from the database. The resulting database query may be a structured query language statement (SQL).

The method of FIG. 4 further includes determining 404 that the database query is expandable. Determining 404 that the database query is expandable may be carried out by evaluating the database query to determine whether the database query may be modified to retrieve expanded results. Specifically, before the database query is sent to the cloud-based data warehouse 192, the query execution engine 126 determines whether the database query includes attributes that indicate that the database query may be modified to retrieve a larger data set. Expanded results refers to a data set the includes the initial results targeted by the database query and, additionally, results not included in the initial results. The difference between the expanded results and initial results may be useful in servicing subsequent database queries.

Prior to determining whether the database query is expandable, the query execution engine 126 may search a local cache (client computing system cache or intermediary computing system cache) for a previously retrieved data set that includes the initial results. Previous query results may be stored in a cache (client computing system cache or intermediary computing system cache) local (i.e., on the same system) to the query execution engine 126. As each database query is generated, the cache may be searched in an attempt to service the database query using previously retrieved results. If a previously retrieved data set that includes the results of the current database query, then fetching the results from the cloud-based data warehouse 192 may be avoided.

The method of FIG. 4 further includes modifying 406 the database query to retrieve expanded results from the cloud-based data warehouse 192, wherein the expanded results include the initial results. Modifying 406 the database query to retrieve expanded results from the cloud-based data warehouse 192 may be carried out by altering one or more elements in the database query to cause the database query to retrieve additional results from the cloud-based data warehouse 192. Modifying 406 the database query may include adding or removing elements from the database query.

For example, the database query may be modified to remove or expand a filter applied to the initial results. Specifically, the generated database query may include a filter that excludes a portion of the data set that does not match the filter criteria. Removing or expanding the filter from the database query expands the results to include the data set that does not match the initial filter criteria.

As another example, the database query may be modified to expand the database query to retrieve additional columns. Specifically, the database query may be modified to include other columns from one or more of the tables targeted by the database query. Further, the query execution engine 126 may track the frequency of requests targeting specific columns of data. If the current database query includes columns from the same table without including the most frequently requested columns, the database query may be modified to include the frequently requested columns.

As another example, the database query may be modified to expand or remove limits within the database query. Specifically, the generated database query may include a limit that excludes rows of data beyond a specified boundary. Expanding or removing the limit from the database query expands the results to include further data beyond the specified boundary.

As another example, the database query may be modified to include data sets used by other elements within the GUI. For example, the GUI may include a graph along side the spreadsheet structure. The graph may require a first query result and the spreadsheet structure may present rows from a second query result. The database query may be modified to incorporate both the first query result and the second query result such that both the graph and the spreadsheet structure may be updated using the same database query.

The method of FIG. 4 further includes fetching 408, from the cloud-based data warehouse 192, the expanded results using the modified database query 422. Fetching 408, from the cloud-based data warehouse 192, the expanded results using the modified database query 422 may be carried out by sending, by the query execution engine 126, the modified database query 422 to a database on a cloud-based data warehouse 192. Upon receiving the modified database query 422, the database on the cloud-based data warehouse 192 may process the modified database query 422 to generate the result data set. Finally, the result data set is then transmitted back to the query execution engine 126 as the expanded results.

The above limitations improve the operation of the computer system by retrieving expanded results for a given database query thereby alleviating the need for subsequent calls to the cloud-base data warehouse for queries that target the expanded results. This is accomplished by determining whether a database query is expandable and modifying the database query to retrieve expanded results.

Figure 5:
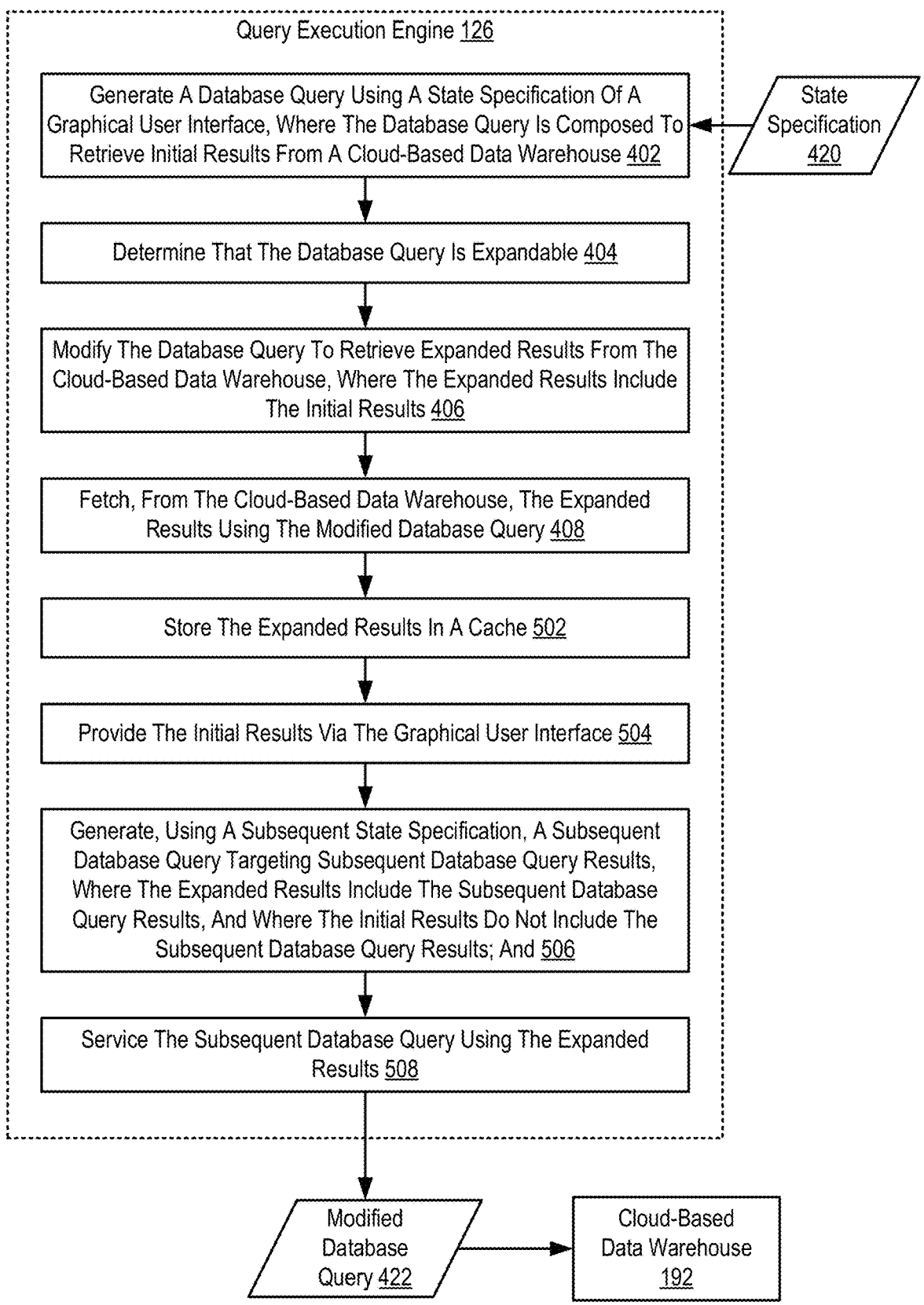
FIG. 5 sets forth a flow chart illustrating an exemplary method for prefetching query results using expanded queries according to embodiments of the present invention.

For further explanation, FIG. 5 sets forth a flow chart illustrating a further exemplary method for prefetching query results using expanded queries according to embodiments of the present invention that includes generating 402 a database query using a state specification 420 of a graphical user interface, wherein the database query is composed to retrieve initial results from a cloud-based data warehouse 192; determining 404 that the database query is expandable; modifying 406 the database query to retrieve expanded results from the cloud-based data warehouse 192, wherein the expanded results include the initial results; and fetching 408, from the cloud-based data warehouse 192, the expanded results using the modified database query 422.

The method of FIG. 5 differs from the method of FIG. 4, however, in that the method of FIG. 5 further includes storing 502 the expanded results in a cache. Storing 502 the expanded results in a cache may be carried out by loading the data set representing the expanded results into a location in the cache (client computing system cache or intermediary computing system cache) for the query execution engine 126. The cache location may be an area of memory allocated for use by the query execution engine 126 and may include results (including expanded results) from previous database queries.

The cache may be structured for searching by the query execution engine 126. Specifically, the results stored in the cache may be organized to provide efficient searching of previous results that match or include the results requested from the current database query. For example, the cache of results may be indexed by database query so that the current database query may be used as a key into the cache of results to determine whether results that include the results requested exist in the cache.

The method of FIG. 5 further includes providing 504 the initial results via the graphical user interface. Providing 504 the initial results via the graphical user interface may be carried out by first extracting the initial results from the expanded results. Once extracted, the initial results may be organized into the spreadsheet structure of the GUI on the client computing system. If the query execution engine 126 is executing within the client computing system, then the results are presented locally through the GUI. If the query execution engine 126 is executing within the intermediary computing system, then the results are transmitted to the client computing system before presentation through the GUI.

The method of FIG. 5 further includes generating 506, using a subsequent state specification, a subsequent database query targeting subsequent database query results, wherein the expanded results include the subsequent database query results, and wherein the initial results do not include the subsequent database query results. Generating 506 a subsequent database query using a subsequent state specification may be carried out by receiving the subsequent state specification from the GUI in response to subsequent inputs to the GUI. The subsequent state specification may be received at any point after the initial state specification used to retrieve the initial results. The subsequent database query results include data that was retrieved using the modified database query but would not have been included in the initial results.

The method of FIG. 5 further includes servicing 508 the subsequent database query using the expanded results. Servicing 508 the subsequent database query using the expanded results may be carried out by searching the cache for the subsequent database query results which may be keyed to a previous database query that matches at least part of the subsequent database query. Once the matching entry is found, the previous results may be retrieved from the cache and presented, via the GUI, as the subsequent database query results.

As an example of the above, assume that the query execution engine generates a database query to retrieve initial results "ABC". The query execution engine may first determine whether "ABC" has been previously stored in the cache after a previously issue database query. If the initial results do not exist in the cache, the query execution engine may then determine that the database query is expandable and modifies the database query to retrieve expanded results "ABCD". The query complier then retrieves "ABCD" from the cloud-based data warehouse and stores "ABCD" in the cache. At a later point, a subsequent database query is generated to retrieve "CD" from the cloud-based data warehouse. The query execution engine is able to retrieve "CD" from the cache without accessing the cloud-based data warehouse even though "D" was not previously requested via interactions with the GUI.

Figure 6:
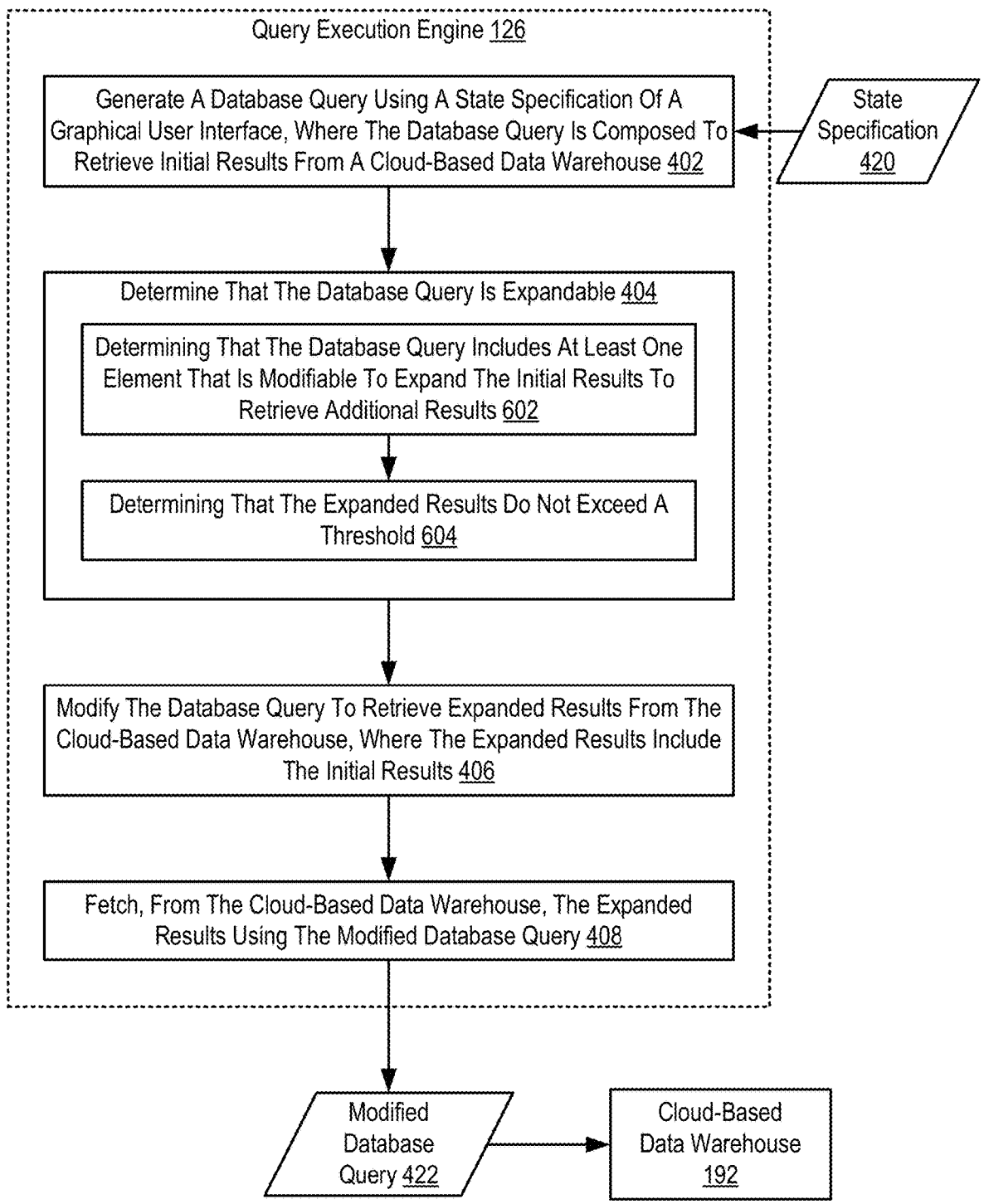
FIG. 6 sets forth a flow chart illustrating an exemplary method for prefetching query results using expanded queries according to embodiments of the present invention.

For further explanation, FIG. 6 sets forth a flow chart illustrating a further exemplary method for prefetching query results using expanded queries according to embodiments of the present invention that includes generating 402 a database query using a state specification 420 of a graphical user interface, wherein the database query is composed to retrieve initial results from a cloud-based data warehouse 192; determining 404 that the database query is expandable; modifying 406 the database query to retrieve expanded results from the cloud-based data warehouse 192, wherein the expanded results include the initial results; and fetching 408, from the cloud-based data warehouse 192, the expanded results using the modified database query 422.

The method of FIG. 6 differs from the method of FIG. 4, however, in that determining 404 that the database query is expandable includes determining 602 that the database query includes at least one element that is modifiable to expand the initial results to retrieve additional results and determining 604 that the expanded results do not exceed a threshold. Determining 602 that the database query includes at least one element that is modifiable to expand the initial results to retrieve additional results may be carried out by evaluating the elements within the database query to match one or more elements to elements that are modifiable and whose modification would expand the initial results. Such elements may include modifiers within the database query, such as a statement that includes a filter or limit instruction.

Determining 604 that the expanded results do not exceed a threshold may be carried out by determining an expected number of results (i.e. number of rows and columns) and comparing the expected number of results to a predetermined threshold number of results. Determining an expected number of results may be carried out by evaluating, by the query execution engine, the state specification and intermediary forms to extrapolate an expected number of record results in the results data set.

The threshold may be based on a limit imposed by the cloud-based data warehouse. Specifically, the cloud-based data warehouse may return an error for database queries that request results larger than the threshold. The threshold may also be based on a cost threshold for retrieving data sets from the cloud-based data warehouse. Specifically, the cloud-based data warehouse may charge a fee for each database query serviced based on the size of the data set requested. The query execution engine may limit the expanded results such that no additional fee is incurred beyond the fee for servicing the initial query results.

The database query may be modified accounting for the threshold. For example, removing a filter or limit may expand the results beyond the threshold. Consequently, the filer or limit may be expanded only to the point that the expanded results remain within the threshold.

In view of the explanations set forth above, readers will recognize that the benefits of prefetching query results using expanded queries according to embodiments of the present invention include:
  Improving the operation of a computing system by retrieving expanded results for a given database query thereby alleviating the need for subsequent calls to the cloud-base data warehouse for queries that target the expanded results. This is accomplished by determining whether a database query is expandable and modifying the database query to retrieve expanded results.

Exemplary embodiments of the present invention are described largely in the context of a fully functional computer system for prefetching query results using expanded queries. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for prefetching query results using expanded queries, the method comprising:
generating a database query using a state specification of a graphical user interface, wherein the database query is composed to retrieve initial results from a table within a cloud-based data warehouse;
determining that the database query is expandable;
modifying the database query to retrieve expanded results from the cloud-based data warehouse, wherein the expanded results include the initial results, and wherein modifying the database query to retrieve the expanded results from the cloud-based data warehouse comprises one selected from a group consisting of expanding the database query to retrieve additional columns from the table and expanding the database query to retrieve additional rows from the table; and
fetching, from the cloud-based data warehouse, the expanded results using the modified database query.

2. The method of claim 1, further comprising:
storing, in a cache, the expanded results including the initial results targeted by the database query and additional results not included in the initial results; and
providing the initial results via the graphical user interface.

3. The method of claim 2, further comprising:
generating, using a subsequent state specification, a subsequent database query targeting subsequent database query results, wherein the expanded results include the subsequent database query results, and wherein the initial results do not include the subsequent database query results; and
servicing the subsequent database query using the expanded results.

4. The method of claim 1, wherein the graphical user interface comprises a presentation of a data set from the cloud-based data warehouse.

5. The method of claim 1, wherein determining that the database query is expandable comprises determining that the database query includes at least one element that is modifiable to expand the initial results to retrieve additional results.

6. The method of claim 1, wherein determining that the database query is expandable comprises determining that the expanded results do not exceed a threshold.

7. The method of claim 1, wherein modifying the database query to retrieve the expanded results from the cloud-based data warehouse comprises removing a filter applied to the initial results.

8. The method of claim 1, wherein modifying the database query to retrieve the expanded results from the cloud-based data warehouse comprises expanding the database query to retrieve additional columns.

9. The method of claim 1, wherein modifying the database query to retrieve the expanded results from the cloud-based data warehouse comprises expanding limits within the database query.

10. The method of claim 1, wherein the database query is a structured query language statement.

11. An apparatus for prefetching query results using expanded queries, the apparatus comprising a computer processor, a computer memory operatively coupled to the computer processor, the computer memory having disposed within it computer program instructions that, when executed by the computer processor, cause the apparatus to carry out the steps of:
generating a database query using a state specification of a graphical user interface, wherein the database query is composed to retrieve initial results from a table within a cloud-based data warehouse;
determining that the database query is expandable;
modifying the database query to retrieve expanded results from the cloud-based data warehouse, wherein the expanded results include the initial results, and wherein modifying the database query to retrieve the expanded results from the cloud-based data warehouse comprises one selected from a group consisting of expanding the database query to retrieve additional columns from the table and expanding the database query to retrieve additional rows from the table; and
fetching, from the cloud-based data warehouse, the expanded results using the modified database query.

12. The apparatus of claim 11, wherein the computer program instructions further cause the apparatus to carry out the steps of:
storing, in a cache, the expanded results including the initial results targeted by the database query and additional results not included in the initial results; and
providing the initial results via the graphical user interface, wherein the initial results are extracted from the expanded results.

13. The apparatus of claim 12, wherein the computer program instructions further cause the apparatus to carry out the steps of:
generating, using a subsequent state specification, a subsequent database query targeting subsequent database query results, wherein the expanded results include the subsequent database query results, and wherein the initial results do not include the subsequent database query results; and
servicing the subsequent database query using the expanded results.

14. The apparatus of claim 11, wherein the graphical user interface comprises a presentation of a data set from the cloud-based data warehouse.

15. The apparatus of claim 11, wherein determining that the database query is expandable comprises determining that the database query includes at least one element that is modifiable to expand the initial results to retrieve additional results.

16. The apparatus of claim 11, wherein determining that the database query is expandable comprises determining that the expanded results do not exceed a threshold.

17. The apparatus of claim 11, wherein modifying the database query to retrieve the expanded results from the cloud-based data warehouse comprises removing a filter applied to the initial results.

18. The apparatus of claim 11, wherein modifying the database query to retrieve the expanded results from the cloud-based data warehouse comprises expanding the database query to retrieve additional columns.

19. The apparatus of claim 11, wherein the database query is a structured query language statement.

20. A computer program product for prefetching query results using expanded queries, the computer program product comprising a non-transitory computer readable medium and computer program instructions stored therein that, when executed, cause a computer to carry out:
generating a database query using a state specification of a graphical user interface, wherein the database query is composed to retrieve initial results from a table within a cloud-based data warehouse;
determining that the database query is expandable;
modifying the database query to retrieve expanded results from the cloud-based data warehouse, wherein the expanded results include the initial results, and wherein modifying the database query to retrieve the expanded results from the cloud-based data warehouse comprises one selected from a group consisting of expanding the database query to retrieve additional columns from the table and expanding the database query to retrieve additional rows from the table; and
fetching, from the cloud-based data warehouse, the expanded results using the modified database query.

* * * * *